United States Patent
Bartos et al.

(10) Patent No.: US 6,688,323 B1
(45) Date of Patent: Feb. 10, 2004

(54) GAS TANK TO PRESSURE REGULATOR COUPLING

(75) Inventors: Josef A. Bartos, Pomona, CA (US); Harsharan Grewal, Diamond Bar, CA (US)

(73) Assignee: GAAP Gas Controls LLC, Pomona, CA (US)

( * ) Notice: Subject to any disclaimer, the term of this patent is extended or adjusted under 35 U.S.C. 154(b) by 202 days.

(21) Appl. No.: 10/082,731

(22) Filed: Feb. 26, 2002

(51) Int. Cl.[7] .................... F16K 17/28; F16K 17/38
(52) U.S. Cl. ................... 137/73; 137/517; 285/1
(58) Field of Search ................. 137/73, 75, 79, 137/517; 285/1, 2, 3

(56) References Cited

U.S. PATENT DOCUMENTS

| | | | | |
|---|---|---|---|---|
| 886,834 A | * | 5/1908 | Michelin | 137/517 |
| 2,223,944 A | * | 12/1940 | Roy | 137/517 |
| 2,245,271 A | * | 6/1941 | Guill | 137/517 |
| 2,684,079 A | * | 7/1954 | Krohm | 137/493.9 |
| 2,943,638 A | * | 7/1960 | Prucha | 137/498 |
| 3,690,336 A | * | 9/1972 | Drum | 137/75 |
| 4,022,244 A | * | 5/1977 | Oman | 137/517 |
| 4,099,538 A | * | 7/1978 | Curtis | 137/73 |
| 4,745,940 A | * | 5/1988 | Ely | 137/73 |
| 4,911,194 A | | 3/1990 | Lechner | |
| 5,330,155 A | | 7/1994 | Lechner | |
| 5,472,008 A | * | 12/1995 | Boarin | 137/75 |
| 5,582,201 A | | 12/1996 | Lee et al. | |
| 5,983,928 A | * | 11/1999 | Hsiao | 137/519.5 |
| 6,155,285 A | * | 12/2000 | Hsiao | 137/75 |

* cited by examiner

Primary Examiner—John Rivell
(74) Attorney, Agent, or Firm—Fay, Sharpe, Fagan, Minnich & McKee

(57) ABSTRACT

A coupling for connecting a cylinder valve on an LPG tank to the inlet of a pressure regulator for gas consuming equipment comprises a nipple having an upstream end for connection with the cylinder valve and a downstream end for connection with the pressure regulator, and a plastic coupling nut for connecting the nipple to the cylinder valve. The end wall of the coupling nut has a metal heat transfer washer on the inner side thereof, and a pressure responsive flexible shutoff valve plate is provided in the nipple passageway. The shutoff valve plate closes the passageway in response to a pressure differential thereacross of no more than 15 psi, and the end wall of the coupling nut and the heat transfer washer are responsive to a temperature of between 240° F. and 300° F. to release the nipple for displacement away from the cylinder valve in the direction downstream of the nipple.

46 Claims, 3 Drawing Sheets

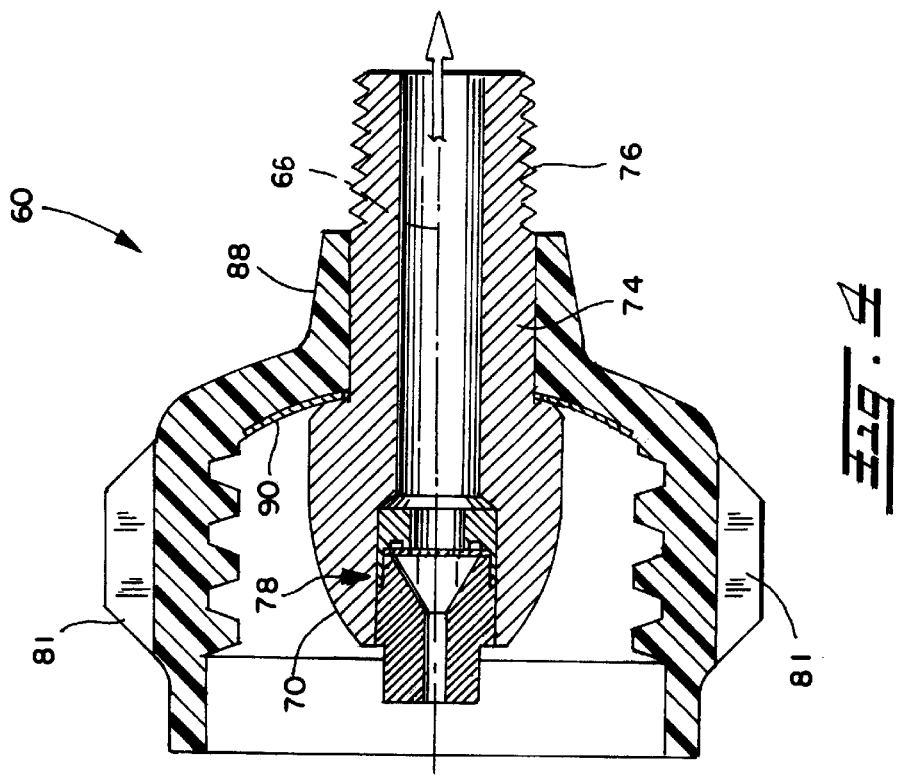
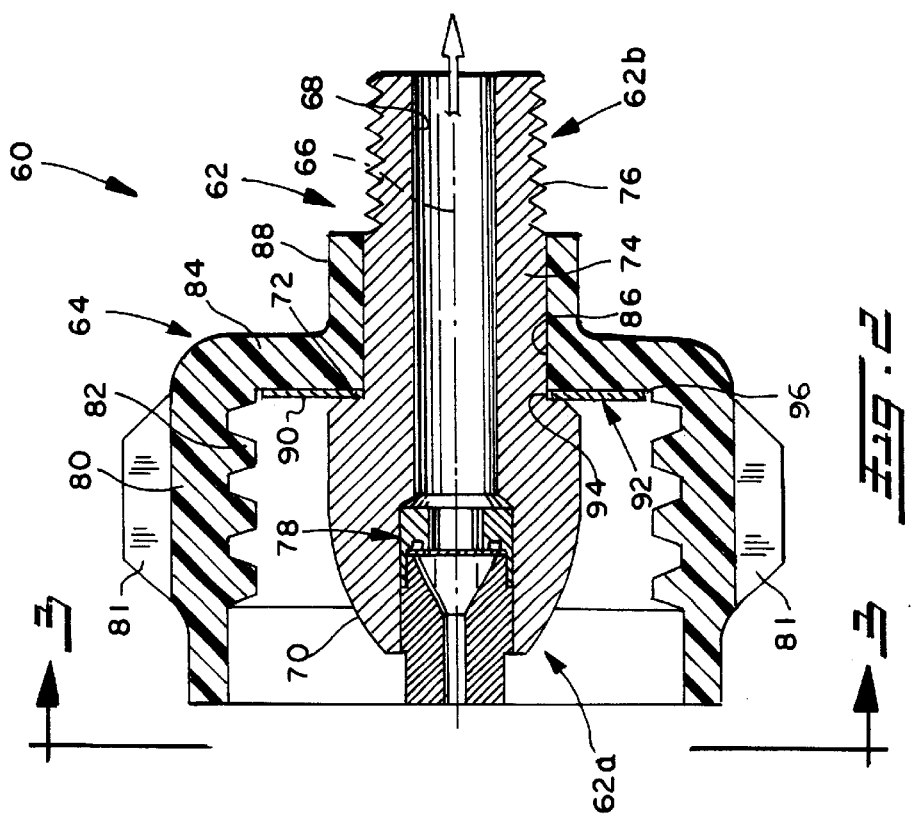

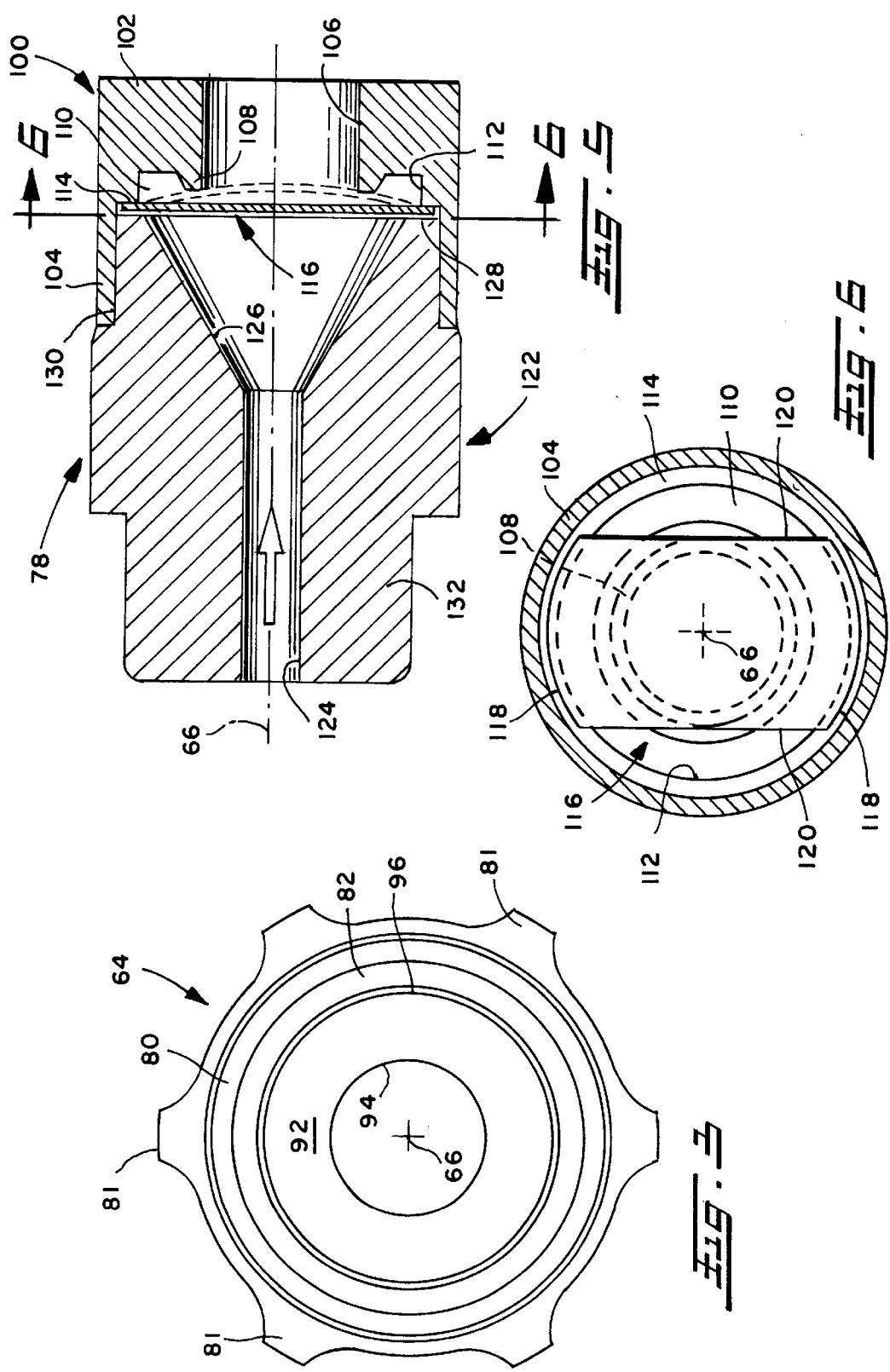

GAS TANK TO PRESSURE REGULATOR COUPLING

BACKGROUND OF THE INVENTION

This invention relates to the art of coupling devices between a gas supply tank and gas consuming equipment and, more particularly, to a coupling for connecting the cylinder valve of an LPG tank to a pressure regulator for delivering gas to gas consuming equipment.

The use of LPG tanks as a gas supply for outdoor grills, gas consuming equipment in motor homes and the like is well known as is the fact that the flow of gas from the tank to the gas consuming appliance is through a cylinder valve mounted on the tank, a pressure regulator connected to the appliance and a quick connect coupling between the outlet side of the cylinder valve and the inlet side of the pressure regulator. The latter coupling comprises a nipple component having a gas flow passageway therethrough, an inlet end for connecting the nipple to the cylinder valve through the use of a coupling nut, and an externally threaded outlet end for connection to the pressure regulator. When the coupling is connected to the cylinder valve, the upstream end of the nipple engages and displaces a check valve in the cylinder valve from the closed to the open position thereof permitting flow of gas from the tank through the coupling to the pressure regulator and gas consuming equipment. The coupling, when connected between the cylinder, valve and pressure regulator, is required by UL and other agencies to have a gas flow limiting valve arrangement for shutting off flow from the LPG tank in response to a pressure differential of no more than 15 psig across the valve. The coupling is also required to have a temperature activated arrangement for positively shutting off the flow of gas from the LPG tank in response to exposure of a coupling to a temperature between 240° F. to 300° F. at a gas pressure in the tank of 375 psig. Accordingly, if for example a fitting breaks downstream of the cylinder valve, the pressure drop across the flow control valve will immediately shut off the flow from the LPG tank. Likewise, should the coupling be exposed to an unacceptably high temperature, the nipple will be displaced from the cylinder valve, without unscrewing the coupling nut, a distance at least sufficient to allow closure of the check valve in the cylinder valve.

Efforts heretofore to meet the excess flow shutoff requirement have included the use of a magnetic valve element mounted in the nipple as shown in U.S. Pat. No. 5,330,155 to Lechner. The valve element is a ferrous plate normally held upstream from a valve seat by a magnet mounted in the nipple passageway. In response to excess flow across the valve, the plate is displaced from the magnet to engage against the valve seat and shut off the flow of gas through the nipple. When the gas pressure is equalized on opposite sides of the plate, the latter is drawn back into engagement with the magnet to again open the nipple passage for the flow of gas therethrough. The disadvantages and potential problems in connection with the Lechner arrangement include the cost of manufacture and the potential for the valve to malfunction in response to excess flow thereacross. In part in this respect, the magnet component for holding the magnetic disk has to be mounted in the passageway through the nipple and appropriately positioned relative to the valve seat, and when the valve element is displaced from the magnet by excess gas flow there is the potential that the magnetic disk will turn in the passageway and therefore fail to engage the valve seat transverse to the axis of the passageway as is necessary to shut off flow through the nipple.

Efforts heretofore to meet the foregoing requirement for the shutoff of gas flow in response to exposure of the coupling nut to an excessive temperature have included the provision of the end wall of the coupling nut with an axially extending circumferential recess or other weakening arrangement of the wall. In response to the exposure of the coupling nut to an excessively high temperature, the end wall is axially distorted by the pressure of the gas flow from the tank and the force of the check valve biasing spring against the nipple, whereby the latter is released or displaced outwardly relative to the coupling nut a distance sufficient to disengage the check valve and thus shut off the flow of gas from the tank to the coupling assembly. Arrangements of this character are shown in the aforementioned patent to Lechner and in U.S. Pat. Nos. 4,911,194 to Lechner and 5,582,201 to Lee, et al. The disadvantages with regard to weakening the end wall of the coupling nut by axially recessing or thinning the axial dimension of the end wall, whether the coupling nut is made of plastic or metal is that the end wall can be pre-stressed or broken during screwing of the coupling nut onto the cylinder valve. If the weakened end wall is broken during assembly, the assembly cannot be completed without replacement of the coupling nut. If the weakened end wall is pre-stressed during assembly, then there is the potential for the release of the nipple to occur at a temperature below that intended and, therefore, at a temperature which is below that required in accordance with the safety standards.

SUMMARY OF THE INVENTION

The present invention provides a coupling for connecting the cylinder valve on an LPG tank with a pressure regulator for supplying gas to gas consuming equipment having improved excess flow and thermally responsive shutoff arrangements which minimize or overcome the foregoing and other disadvantages of such shutoff arrangements heretofore available. More particularly in this respect, an excess flow shutoff valve in accordance with the present invention comprises a planar valve plate, preferably of stainless steel, axially captured between components of an insert for the nipple component and operates like a leaf spring. The valve plate is spaced upstream from a valve seat provided on one of the insert components and, normally, is in a planar condition transverse to the axis of the passageway through the nipple. In response to excessive gas flow through the nipple, the valve plate is distorted downstream against the resiliency thereof to a concave condition engaging the valve seat and shutting off the flow of gas through the nipple. The excess flow responsive valve is economical to manufacture and assemble both with respect to the component parts thereof and the assembly of the insert with the nipple, and the valve is reliable and efficient in operation. Further in accordance with the present invention, the thermally responsive shutoff arrangement advantageously involves the use of the end wall of the coupling nut but without weakening of the latter such that the shutoff function does not take place in response to a condition, including temperature, other than that sought in connection with meeting the required safety standards. More particularly in this respect, the axially inner side of the end wall is associated with a heat transfer component, preferably in the form of a metal washer. The end wall and heat transfer component engage against a shoulder on the nipple and thus against the gas pressure and check valve biasing spring force when assembled with the cylinder valve, and the heat transfer component advantageously rigidifies the end wall against undesired pre-stressing thereof when the coupling nut is screwed onto the cylinder valve and/or premature axially outward distortion of the end wall in response to a temperature below that desired for release. Furthermore, the heat transfer element advantageously promotes the transfer of heat to the end wall and thus the desired axially outward distortion thereof in response to a predetermined temperature and, in doing so, enables the axial thickness of the end wall to be optimized in connection with obtaining structural integrity thereof against undesired axial distortion and/or pre-stressing in connection with attaching the nipple to the cylinder valve.

It is accordingly an outstanding object of the present invention to provide a coupling for connection between the cylinder valve of an LPG tank and a pressure regulator for delivering gas to gas consuming equipment having improved excess flow and thermal responsive gas flow shutoff arrangements.

Another object is the provision of a coupling of the foregoing character in which the excess flow shutoff valve operates in the manner of a leaf spring which is transverse to the direction of gas flow and thus reliable in operation.

Still another object is the provision of a coupling of the foregoing character wherein axial displacement of the end wall of a coupling nut in response to exposure thereof to a predetermined high temperature is promoted by a heat transfer element facially engaging against the inside surface of the end wall.

A further object is the provision of a coupling of the foregoing character in which the thermally responsive shut-off arrangement includes the use of a heat transfer component in connection with the end wall of the coupling nut in a manner which rigidifies the end wall against pre-stressing or undesired axial distortion when the nipple is connected to the cylinder valve while providing for the end wall to be axially displaced to release the nipple from the check valve of the cylinder valve in response to exposure of the coupling nut to a predetermined temperature.

Another object is the provision of a coupling of the foregoing character in which the excess flow and thermally responsive gas shutoff arrangements are simple in construction, economical to manufacture and reliable in use.

BRIEF DESCRIPTION OF THE DRAWINGS

The foregoing objects and others, will in part be obvious and in part pointed out more fully hereinafter in conjunction with the written description of a preferred embodiment of the invention illustrated in the accompanying drawings in which:

FIG. 2 is a sectional elevation view of a coupling in accordance with the present invention;

FIG. 3 is an end elevation view of the coupling nut looking in the direction of line 3—3 in FIG. 2;

FIG. 4 is a sectional elevation view showing distortion of the end wall of the coupling nut in response to exposure thereof to a predetermined high temperature;

FIG. 5 is an enlarged sectional elevation view showing the insert providing the excess flow responsive valve component of the coupling; and, FIG. 6 is a cross-sectional elevation view of the insert taken along line 6—6 in FIG. 5.

DESCRIPTION OF A PREFERRED EMBODIMENT

Figure 1:
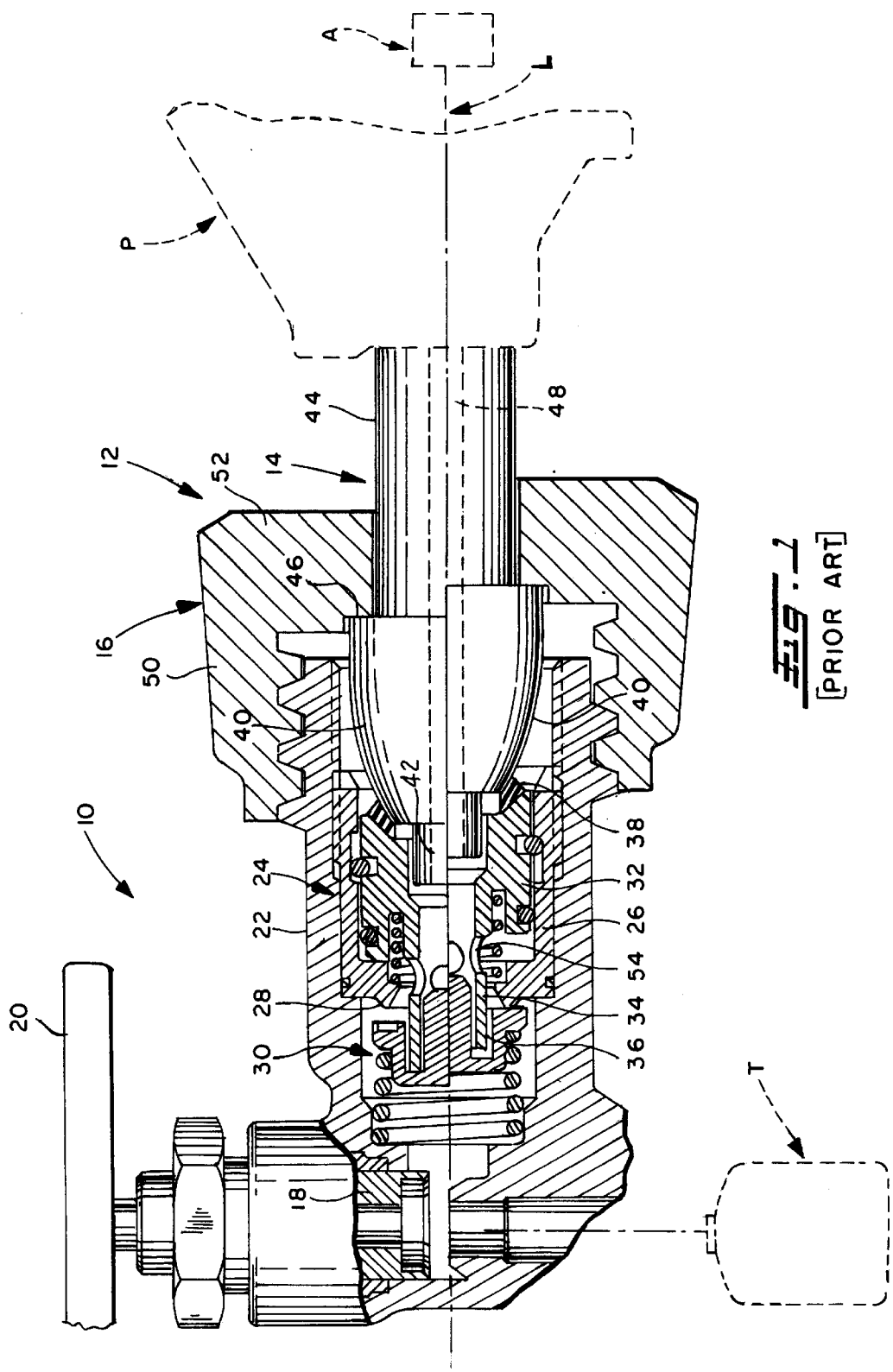
FIG. 1 is a sectional elevation view of a prior art coupling comprising a nipple and coupling nut for connecting a cylinder valve on an LPG tank with a pressure regulator for supplying gas to gas consuming equipment.

Referring now in greater detail to the drawings, wherein the showings are for the purpose of illustrating a preferred embodiment of the invention only, and not for the purpose of limiting the invention, FIG. 1 illustrates a prior art arrangement for connecting an LPG tank T with a gas consuming appliance A, such as a propane gas grill, and which arrangement comprises a cylinder valve 10 mounted on tank T, a pressure regulator P connected to appliance A by a line L, and a coupling 12 connecting valve 10 with pressure regulator P and comprising a nipple 14 and a coupling nut 16. As is well known, valve 10 includes a primary shutoff valve element 18 operable through a knob or handle 20 to open and close valve 10 to the flow of gas from tank T to outlet conduit 22 of the valve. As is further well known, outlet conduit 22 supports a check valve insert 24 which, in the embodiment illustrated, includes a body member 26 providing a valve seat 28, a check valve element 30 biased toward seat 28 by a spring 31, and a valve actuating component 32 having a tubular nose portion 34 received in an annular recess 36 in valve element 30. The downstream end of valve actuator 32 is provided with an annular resilient seal 38 for the purpose set forth hereinafter. Nipple 14 includes a nose portion 40 having a probe component 42 at the forward or upstream end thereof and a shank portion 44 extending downstream from nose 40 and the downstream end of which, not shown, is externally threaded for connection with pressure regulator P. Probe 42 facilitates guidance of the nipple into alignment with valve actuating component 32 of the tank valve. A radially outwardly extending circumferential shoulder 46 is provided between nose 40 and the upstream end of shank 44, and the nipple includes a passageway 48 therethrough for the flow of gas from tank T to the pressure regulator. Nipple 14 is removably connected to the tank valve by coupling nut 16 which, for the latter purpose, includes an internally threaded sleeve or skirt portion 50 for mating engagement with external threads on outlet conduit 22 of the tank valve. Further nut 16 includes a radially inwardly extending end wall 52 which is aperture to receive nipple shank 44 and the radially inner edge portion of which engages against shoulder 46 to displace nipple 14 to the left in FIG. 1 in connection with the assembly operation.

As will be appreciated from the upper and lower portions of the tank valve in FIG. 1, check valve element 30 respectively has open and closed positions relative to valve seat 28 and in which positions nose 40 respectively engages against and is spaced from sealing element 38. Accordingly, it will be appreciated that movement of nose 40 to the left in FIG. 1 from the position of the nose shown in the lower portion of the drawing causes the nose to engage sealing element 38 and, thereafter, to displace actuator member 32 to the left of nose 34 thereof to engage and displace check valve element 30 to the open position thereof. In the open position of valve element 30, gas can flow from tank T around the valve element, across seat 28 and thence into actuator 32 through ports 54 in nose 34 and into nipple passageway 48. When nipple 14 is displaced to the right in FIG. 1 from the open position of check valve element 30, spring 31 biases the latter into engagement with seat 28 to shut off the gas flow from tank T through discharge conduit 22 of the tank valve.

A coupling 60 in accordance with the present invention is illustrated in FIGS. 2–6 of the drawing and, while the coupling will be described in connection with a cylinder valve such as that shown in FIG. 1, it will be appreciated that the coupling can be used with a wide variety of structurally different cylinder valves. Coupling 60 comprises a brass nipple 62 and a coupling nut 64 by which the nipple is releasably connected to the externally threaded discharge conduit of a cylinder valve. Nipple 62 has an axis 66, upstream and downstream ends 62a and 62b, respectively, and a passageway 68 therethrough which is coaxial with axis 66 and which has upstream and downstream ends respectively corresponding to upstream and downstream ends 62a and 62b of the nipple. Further, the nipple includes an ellipsoidal nose portion 70 extending from the upstream end thereof towards the downstream end, a radially inwardly extending circumferential shoulder 72 intermediate the upstream and downstream ends of the nipple, and a shank 74 extending downstream from shoulder 72 and having external threads 76 at the downstream end of the nipple for connecting the latter with a pressure regulator. In accordance with one aspect of the invention, and as will be described in greater detail hereinafter, the upstream end of nipple 62 is provided with a flow responsive shutoff valve assembly 78.

Coupling nut 64 is constructed from a thermoplastic material and, as best seen in FIGS. 2 and 3, comprises a sleeve 80 having internal threads 82 for mating engagement with the external threads on a cylinder valve, and a radially extending end wall 84 at one end of the sleeve and having an opening 86 therethrough for receiving shank portion 74 of the nipple. Preferably, the radially inner end of wall 84 terminates in a cylindrical flange 88 which surrounds shank portion 74 and extends downstream from wall 84. Opening 86 is coaxial with axis 66 when nut 64 is assembled therewith, and the axially inner side 90 of wall 84 faces shoulder 72 of the nipple when the coupling nut is assembled therewith. In accordance with another aspect of the present invention, a heat transfer element 92 is interposed between wall 84 of the coupling nut and shoulder 72 of the nipple and, preferably, is in the form of a washer having an opening 94 for receiving shank 44 of the nipple. The portions of end wall 84 and heat transfer element 92 radially outwardly adjacent openings 86 and 94 thereof axially engage against shoulder 72 of the nipple when the nipple is connected to a cylinder valve and, preferably, heat transfer element 90 extends radially outwardly along wall 84 and has a radially outer peripheral edge 96 adjacent the inner periphery of threads 82 on sleeve 80 of the coupling nut. Accordingly, the radially outer portions of wall 84 and heat transfer element 92 have a radial dimension considerably greater than that of the inner portion which engages shoulder 72 of the nipple. The outer surface of sleeve 80 is provided with protuberances 81 spaced apart thereabout to facilitate screwing of the coupling nut onto a cylinder valve by hand.

As will be appreciated from FIG. 1, if coupling 60 is mounted on a cylinder valve 10, nose 70 engages and depresses valve actuator 32 to open valve element 30 against the bias of spring 31 to establish the flow of gas from tank T to pressure regulator P. End wall 84 and heat transfer element 92 cooperatively provide a temperature activated shutoff arrangement for closing valve 30 of the cylinder valve in the event that coupling nut 64 is exposed to an undesirably high temperature which, in accordance with UL regulations is between 240° F. to 300° F. As shown in FIG. 4, exposure of the coupling nut to such temperature when coupling 60 is connected to the cylinder valve results in end wall 84 softening and becoming deflectable such that the force of biasing spring 31 against valve 30 displaces actuator 32 and thus nose 70 of nipple 62 outwardly of the cylinder valve in the direction downstream of the nipple so that valve 30 closes and shuts off the flow of gas from tank T to the cylinder valve outlet. Heat transfer element 92 advantageously promotes the response to exposure of the coupling nut to an undesirably high temperature by transferring heat directly to the axially inner side of end wall 84 of the coupling nut. Prior to such softening of end wall 84, heat transfer element 92 and flange 88 extending downstream from the end wall advantageously rigidify the end wall against axial deflection thereof in the downstream direction during screwing of the coupling nut onto the cylinder valve.

As mentioned hereinabove, the upstream end of nipple 62 is provided with a flow responsive shutoff valve assembly 78 which is responsive to a predetermined pressure drop or pressure differential across the valve. As best seen in FIGS. 5 and 6, valve assembly 78 comprises an annular body member 100 having an end wall 102 transverse to axis 66 of nipple 62 and an annular side wall 104 extending in the upstream direction from end wall 102. End wall 102 has an opening 106 therethrough coaxial with axis 66, and an annular valve seat 108 surrounds opening 106 on the upstream side of end wall 102. A recess 110 surrounds valve seat 108 and faces in the upstream direction, and recess 110 has a radially outer peripheral wall 112 which intersects a radially outwardly extending circumferential shoulder 114 provided in body member 100 in a plane transverse to axis 66 and spaced upstream from valve seat 108. Valve assembly 78 further includes a flexible, leaf spring valve plate 116 having diametrically opposite arcuate end edges 118 and parallel spaced apart linear side edge 120 extending between end edges 118. End edges 118 provide diametrically opposite end portions of the valve plate which extend across the valve seat and overlie shoulder 114, and side edges 120 are spaced inwardly from outer wall 112 of recess 110 to laterally span the valve seat. Accordingly, when the valve plate is in the planar condition shown in solid lines in FIG. 5, it is transverse to axis 66 and gas can flow around the valve plate into recess 110 and thence across valve seat 108 into opening 106 in end wall 102 of the body member.

Valve assembly 78 further includes an orifice insert 122 having a passageway 124 therethrough which is coaxial with axis 66. The downstream end of passageway 124 terminates in a conical surface 126 flaring outwardly and downstream with respect to axis 66 and provides the downstream end of insert 122 with a radially outwardly extending end face 128 spaced upstream from and overlying shoulder 114 on body member 100. The downstream end of orifice insert 122 is provided with a circumferentially extending recess 130 which axially receives side wall 104 of body member 100 and, preferably, insert 122 and body member 100 are interconnected by a press fit therebetween. The upstream end of orifice insert 122 is machined to provide a probe 132 extending upstream from nose 70 of nipple 62 when the valve assembly is assembled therewith, and the latter assembly is also preferably by a press fit between the upstream end of passage 68 in the nipple and the valve assembly. Valve plate 116 has a diametrical dimension between opposite edges 118 which is slightly less than the inner diameter of sidewall 104, and inner end face 128 of orifice insert 122 is spaced from shoulder 114 of body member 100 a distance slightly greater than the thickness of valve plate 116. The latter relationship advantageously enables the valve plate to be displaced between a first position shown by solid lines in FIG. 5 and which as mentioned above, the valve plate is planar and transverse to axis 66, and a second position shown by broken lines in FIG. 5 and in which the valve plate is concave in the direction towards the downstream end of the valve assembly and engages valve seat 108 to shut off the flow of gas from passageway 124 to opening 106 in body member 100. Normally, gas flow is across valve plate 116 with the latter in its first position, and the valve plate closes against seat 118 in response to an excess flow thereacross resulting in a predetermined pressure differential across the valve of no more than 15 psi.

In the embodiment herein illustrated and described, the coupling nut is produced from polycarbonate having a melting point of 300° F., and end wall 84 of the nut has an axial thickness of 0.170 inch–0.010 inch. The axially inner side of end wall 84 has an outer diameter between opening 86 and threads 82 of 1.155 inches+0.010 inch, and the diameter of opening 86 is 0.551 inch+0.005 inch. Flange 88 of the coupling nut has an axial length of about 0.302 inch from the outside of wall 84 and a radial thickness of about 0.085 inch at the outer end thereof. Heat transfer element 92 a brass washer annealed to an "O" soft condition, and the washer has an outer diameter of 1.122 inch–0.015 inch, an inner diameter of 0.551 inch±0.002 inch and a thickness of 0.0295 inch±–0.002 inch. The washer can be separate from or suitably bonded to end wall 84 of the coupling nut. With respect to flow responsive valve assembly 78, body member 100 is of brass or Delrin, and orifice insert 122 is of brass. Shoulder 114 of body member 100 is axially spaced from the face of valve seat 108 0.0075 inch±0.0005 inch and opening 106 and thus valve seat 108 have an inner diameter of 0.110 inch+0.003 inch. The valve seat has an outer diameter of 0.141 inch+0.005 inch, and the axial gap between shoulder 114 and inner end 128 of the orifice insert is 0.010 inch+0.0055 inch. Valve plate 116 is fully hardened stainless steel and has an outer diameter between opposite end edges 118 of 0.315 inch–0.003 inch, a width between side edges 120 of 0.171 inch–0.003 inch, and a thickness of 0.0020 inch±0.0002 inch.

While considerable emphasis has been placed herein on the structures, materials and dimensions of the component parts of the preferred embodiment of the present invention, it will be appreciated that many changes can be made in the preferred embodiment and other embodiments devised without departing from the principles of the present invention. Accordingly, it is to be distinctly understood that the foregoing descriptive matter is to be interpreted merely as illustrative of the invention and not as a limitation.

Having thus described the invention, it is so claimed:

1. A coupling for connecting a cylinder valve on an LPG tank to the inlet of a pressure regulator for gas consuming equipment, comprising a nipple having an upstream end for connection with the cylinder valve and a downstream end for connection with the pressure regulator, said nipple having an axis and a passageway axially therethrough between said upstream and downstream ends, said nipple having a radially outwardly extending shoulder between the ends thereof, a plastic coupling nut for connecting said nipple to the cylinder valve said coupling nut having an internally threaded sleeve, and a radially extending end wall at one end of the sleeve, said end wall having an opening therethrough for receiving said nipple, said end wall radially outwardly adjacent said opening axially facing the shoulder of said nipple when said nipple is connected to said cylinder valve, said passageway including a pressure responsive shutoff valve for closing said passageway in response to a predetermined pressure differential across said shutoff valve, and heat transfer means between said end wall of said coupling nut and said shoulder for transferring heat to said end wall for releasing said nipple for displacement away from said cylinder valve in the direction downstream of said nipple in response to exposure of the coupling nut to a temperature in excess of a predetermined temperature.

2. A coupling according to claim 1, wherein said predetermined pressure differential is not greater than 15 psi.

3. A coupling according to claim 1, wherein said predetermined temperature is between 240° F. and 300° F.

4. A coupling according to claim 1, wherein said coupling nut is plastic.

5. A coupling according to claim 1, wherein said heat transfer means includes a heat transfer element between said end wall and said shoulder of said nipple.

6. A coupling according to claim 5, wherein said heat transfer element is a metal washer having an opening therethrough for receiving said nipple and a radially outer periphery adjacent said sleeve of said coupling nut.

7. A coupling according to claim 6, wherein said coupling nut is polycarbonate.

8. A coupling according to claim 7, wherein said washer is annealed brass.

9. A coupling according to claim 6, wherein said washer has a radially inner edge portion extending about said opening therethrough and a radially outer portion between said inner edge portion and said outer periphery of said washer, said inner edge portion having a radial dimension less than the radial dimension of said radially outer portion.

10. A coupling according to claim 9, wherein said washer is annealed brass.

11. A coupling according to claim 10, wherein said plastic is polycarbonate.

12. A coupling according to claim 1, wherein said passageway has upstream and downstream ends and said pressure responsive shutoff valve includes means providing a valve seat coaxial with said axis and facing said upstream end of said passageway, and a flexible valve plate on the upstream side of said valve seat, said valve plate having peripheral edge means axially captured in said passageway.

13. A coupling according to claim 12, wherein said valve plate has a first position in which said plate is planar and transverse to said axis and a said second position in which said plate is concave in the direction from said upstream end toward said downstream end of said passageway.

14. A coupling according to claim 12, wherein said valve plate is metal.

15. A coupling according to claim 14, wherein said metal is stainless steel.

16. A coupling according to claim 12, wherein said valve seat is annular and said valve plate includes spaced apart arcuate opposite ends and spaced apart parallel linear side edges, said opposite ends providing said edge means.

17. A coupling according to claim 12, wherein said shutoff valve includes an annular recess surrounding said seat and facing upstream of said passageway, said recess having an outer diameter, and said valve plate having opposite ends spaced apart a distance greater than said diameter and opposite side edges spaced apart a distance less than said diameter, said opposite ends providing said edge means.

18. A coupling according to claim 17, wherein said opposite ends are arcuate and said opposite side edges are linear.

19. A coupling according to claim 18, wherein said valve plate is stainless steel.

20. A coupling according to claim 1, wherein said passageway has upstream and downstream ends and said pressure responsive shutoff valve includes a valve assembly received in said upstream end of said passageway, said valve assembly comprising a body member having an end wall transverse to said axis and an annular side wall extending in the upstream direction from said end wall, an opening through said end wall coaxial with said axis, a valve seat surrounding said opening on the upstream side of said end wall, a flexible planar valve plate upstream of said valve seat, and means including an orifice insert in said body member for supporting said valve plate in a first position in which said valve plate is planar and spaced upstream from said seat, said valve plate having a second position engaging said seat to close said passageway and in which said valve plate is concave in the direction from said upstream end toward said downstream end of said passageway.

21. A coupling according to claim 20, wherein said body member includes a recess surrounding said seat and facing in the upstream direction, said recess having a radially outer peripheral wall, said body member including a radially outwardly extending circumferential shoulder intersecting said peripheral wall in a plane transverse to said axis and spaced in the upstream direction from said seat, said orifice insert having a downstream end overlying said shoulder, and said valve plate being captured between said shoulder and said downstream end of said orifice insert.

22. A coupling according to claim 21, wherein said shoulder has a radially outer edge having a given diameter and said valve plate has diametrically opposite edge portions overlying said shoulder and having radially outer edges spaced apart a distance less than said given diameter.

23. A coupling according to claim 22, wherein said shoulder has a radially inner edge and said valve plate includes edge means between said diametrically opposite edge portions and spaced radially inwardly from said radially inner edge.

24. A coupling according to claim 23, wherein said edge means includes parallel spaced apart linear edges.

25. A coupling according to claim 24, wherein said valve plate is stainless steel.

26. A coupling according to claim 21, wherein said valve plate is stainless steel.

27. A coupling for connecting a cylinder valve on an LPG tank to the inlet of a pressure regulator for gas consuming equipment, comprising a nipple having an upstream end for connection with the cylinder valve and a downstream end for connection with the pressure regulator, said nipple having an axis and a passageway axially therethrough having upstream and downstream ends, said nipple having a radially outwardly extending shoulder between the ends thereof, a plastic coupling nut for connecting said nipple to the cylinder valve, said coupling nut having an internally threaded sleeve, and a radially extending end wall at one end of the sleeve, said end wall having an opening therethrough for receiving said nipple, said end wall having an axially inner side, a heat transfer element on said inner side having an opening therethrough for receiving said nipple and a radially outer periphery adjacent said sleeve, said end wall and said heat transfer element radially outwardly adjacent said opening axially engaging against the shoulder of said nipple when said nipple is connected to said cylinder valve, a pressure responsive shutoff valve in said passageway including a valve seat coaxial with said axis and facing said upstream end of said passageway and a valve plate on the upstream side of said valve seat, said valve plate having a first position spaced from said valve seat and a second position engaging said valve seat to close said passageway in response to a pressure differential across said shutoff valve of no more than 15 psi, and said end wall of said coupling nut and said heat transfer element being responsive to a temperature between 240° F. and 300° F. to release said nipple for displacement away from said cylinder valve in the direction downstream of said nipple.

28. A coupling according to claim 27, wherein said plastic coupling nut is polycarbonate.

29. A coupling according to claim 28, wherein said heat transfer element is annealed brass.

30. A coupling according to claim 27, wherein said shutoff valve includes an annular recess surrounding said seat and facing upstream of said passageway, said recess having an outer diameter, and said valve plate having arcuate opposite ends spaced apart a distance greater than said diameter and linear side edges between said ends and parallel and spaced apart a distance less than said diameter.

31. A coupling according to claim 30, wherein said valve plate is stainless steel.

32. A coupling according to claim 27, wherein said pressure responsive shutoff valve includes a valve assembly received in said upstream end of said passageway, said valve assembly comprising a body member having an end wall transverse to said axis and an annular side wall extending in the upstream direction from said end wall, an opening through said end wall coaxial with said axis, a valve seat surrounding said opening on the upstream side of said end wall, and means including an orifice insert in said body member for supporting said valve plate relative to said valve seat.

33. A coupling according to claim 32, wherein said body member includes a recess surrounding said seat and facing in the upstream direction, said recess having a radially outer peripheral wall, said body member including a radially outwardly extending circumferential shoulder intersecting said peripheral wall in a plane transverse to said axis and spaced in the upstream direction from said seat, said orifice insert having a downstream end overlying said shoulder, and said valve plate being captured between said shoulder and said downstream end of said orifice insert.

34. A coupling according to claim 33, wherein said shoulder has a radially outer edge having a given diameter and a radially inner edge, said valve plate having diametrically opposite edge portions overlying said shoulder and having radially outer arcuate edges spaced apart a distance less than said given diameter and parallel spaced apart linear side edges between said edge portions and spaced radially inwardly from said inner edge of said shoulder.

35. A coupling according to claim 34, wherein said valve plate is stainless steel.

36. A coupling according to claim 35, wherein said plastic coupling nut is polycarbonate and said heat transfer element is annealed brass.

37. A coupling for connecting a cylinder valve on an LPG tank to the inlet of a pressure regulator for gas consuming equipment, comprising a nipple having an upstream end for connection with the cylinder valve and a downstream end for connection with the pressure regulator, said nipple having an axis and a passageway axially therethrough having upstream and downstream ends, said nipple having a radially outwardly extending shoulder between the ends thereof, a coupling nut for connecting said nipple to the cylinder valve, said coupling nut having an internally threaded sleeve and a radially extending end wall at one end of the sleeve, said end wall having an opening therethrough for receiving said nipple, a pressure responsive shutoff valve in said passageway including a valve seat coaxial with said axis and facing said upstream end of said passageway and a valve plate on the upstream side of said valve seat, an annular recess surrounding said seat and facing upstream of said passageway, said recess having an outer diameter, said valve plate having arcuate opposite ends spaced apart a distance greater than said diameter and linear side edges between said ends and parallel and spaced apart a distance less than said diameter, and said valve plate having a first position spaced from said valve seat and a second position engaging said valve seat to close said passageway in response to a pressure differential across said shutoff valve of no more than 15 psi.

38. A coupling according to claim 37, wherein said valve plate is stainless steel.

39. A coupling according to claim 37, wherein said pressure responsive shutoff valve includes a valve assembly received in said upstream end of said passageway, said valve assembly comprising a body member having an end wall transverse to said axis and an annular side wall extending in the up stream direction from said end wall, an opening through said end wall coaxial with said axis, said valve seat surrounding said opening on the upstream side of said end wall, and means including an orifice insert in said body member for supporting the arcuate opposite ends of said valve plate relative to said valve seat.

40. A coupling according to claim 39, wherein said recess has a radially outer peripheral wall and said body member includes a radially outwardly extending circumferential shoulder intersecting said peripheral wall in a plane transverse to said axis and spaced in the upstream direction from said seat, said orifice insert having a downstream end overlying said shoulder, and said arcuate opposite ends of said valve plate being captured between said shoulder and said downstream end of said orifice insert.

41. A coupling according to claim 40, wherein said shoulder has a radially outer edge having a shoulder diameter and a radially inner edge, said arcuate opposite ends of said valve plate overlying said shoulder and being spaced apart a distance less than said shoulder diameter, and said side edges between said ends being spaced radially inwardly from said inner edge of said shoulder.

42. A coupling according to claim 41, wherein said valve plate is stainless steel.

43. A coupling for connecting a cylinder valve on an LPG tank to the inlet of a pressure regulator for gas consuming equipment, comprising a nipple having an upstream end for connection with the cylinder valve and a downstream end for connection with the pressure regulator, said nipple having an axis and a passageway axially therethrough having upstream and downstream ends, said nipple having a radially outwardly extending shoulder between the ends thereof, a plastic coupling nut for connecting said nipple to the cylinder valve, said coupling nut having an internally threaded sleeve and a radially extending end wall at one end of the sleeve, said end wall having an opening therethrough for receiving said nipple, said end wall having an axially inner side, a heat transfer element on said inner side having an opening therethrough for receiving said nipple and a radially outer periphery adjacent said sleeve, said end wall and said heat transfer element radially outwardly adjacent said opening axially engaging against the shoulder of said nipple when said nipple is connected to said cylinder valve, and said end wall of said coupling nut and said heat transfer element being responsive to a temperature between 240° F. and 300° F. to release said nipple for displacement away from said cylinder valve in the direction downstream of said nipple.

44. A coupling according to claim 43, wherein said plastic coupling nut is polycarbonate.

45. A coupling according to claim 43, wherein said heat transfer element is annealed brass.

46. A coupling according to claim 43, wherein said plastic coupling nut is polycarbonate and said heat transfer element is annealed brass.

* * * * *